United States Patent [19]

Roth

[11] 3,801,190

[45] Apr. 2, 1974

[54] METHOD AND APPARATUS FOR SYNCHRONOUS RECORDING OF SOUNDS ON A FILM

[76] Inventor: Johann Roth, Munchener Strasse 38, D-8061 Schwabhausen, Germany

[22] Filed: Oct. 12, 1972

[21] Appl. No.: 297,016

[30] Foreign Application Priority Data

Oct. 15, 1971 Germany .............................. 2151549

[52] U.S. Cl. .......................................... 352/5, 352/17

[51] Int. Cl. .......................................... G03b 31/04

[58] Field of Search .................................. 352/5, 17

[56] References Cited

UNITED STATES PATENTS 3,563,641 2/1971 Ryder .................................. 352/17

3,049,965 8/1962 Gunst ................................... 352/5

*Primary Examiner*—Samuel S. Matthews

*Assistant Examiner*—Michael L. Gellner

*Attorney, Agent, or Firm*—Ernest F. Marmorek

[57] ABSTRACT

The invention relates to a method for obtaining sound synchronous with a film, the sound events being recorded on a first tape track of a first tape recorder and pulse data are associated with the beginning of each scene of the film being recorded on a second tape track of the first tape recorder. The recorded sound events and pulse data are transferred onto a first and second track of a rapidly startable and stoppable second tape recorder. Start and stop of said second tape recorder are controlled by the pulse data, and stopping is effected with a delay which corresponds substantially to the difference of the frame sequence time and the start delay. The sound events recorded on the first tape track of the second tape recorder are used as sound recording synchronous with the film.

The invention also relates to an apparatus for carrying out the method.

20 Claims, 4 Drawing Figures

METHOD AND APPARATUS FOR SYNCHRONOUS RECORDING OF SOUNDS ON A FILM

BACKGROUND OF THE INVENTION

It is already known to obtain synchronous sound by accelerating picture film and magnetic sound film synchronously from the stationary state to the end speed and by recording at the stationary image at which the sound event to be recorded is to start by a first pulse mark (pilot sound) on a tape. The starting operation of the magnetic sound film coupled to the picture film in a given fixed speed ratio or of the picture film provided with the magnetic sound track is initiated by the first pulse mark. At the end of a sound event recorded on the accompanying tape a second pulse mark is scanned and recorded on said tape.

The stopping of the film during the playing of the tape onto the magnetic sound film or magnetic sound track is controlled by this second pulse mark. The recording of the pilot sound is effected by manual initiation depending on the picture state, i.e. at the beginning and end of the synchronous point, and its reproduction is fully automatic by scanning the magnetic tapes. Admittedly, this apparatus permits exact synchronization independently of human reaction times but has the disadvantage that it requires a considerable constructional expenditure because the synchronous acceleration of the picture film and magnetic sound film can in practice be carried out only by use of a highly precise coupling of the drives for these films.

OBJECTS OF THE INVENTION

It is an object of the invention to provide a method for synchronous recording of sounds on a movie film which is easy to carry out and leads to a precise sound synchronization.

It is another object of the invention to provide a method and an apparatus for recording sounds on a film by relatively simple means which may be used in conjunction with ordinary movie film equipment and tape recorders.

Still another object of the invention is the provision of the sound synchronizing apparatus which is especially adapted for cutting a film and the correlated sound.

These and other objects are achieved by the method that, during running of the film, pulse data synchronous with the picture sequence are recorded on a second sound track of the same type recorder, that the recorded sound events and pulse data are played onto a first and second track of a rapidly startable and stoppable second tape recorder in such a manner that the start and stop of the second tape recorder is controlled by the pulse data, and the stop is effected with a delay which corresponds to the difference between the frame sequence time and the start delay time, and that the sound recorded on the first tape track of the second sound recording unit is used as sound recording synchronous with the movie film. Such a method provides exact synchronization of picture and sound even if a great number of scenes follow each other.

The apparatus for carrying out this method with sound tapes which have recorded on one track while the sound events to be synchronized on another track, by features a rapidly startable and stoppable sound recording unit having at least two tracks, by a control device for energizing the starting mechanism of the sound recording unit when a pulse data occurs, and by delay means for delaying the stopping of the sound recording unit when a pulse data has been received, and further by connecting means for transferring the sound events and pulse data from the tape to be processed onto said two tracks of the sound recording unit.

DESCRIPTION OF THE DRAWINGS

The invention will be additionally described below with reference to the schematic drawings of an example of the embodiment.

DESCRIPTION OF THE PREFERRED EMBODIMENTS

Figure 1:
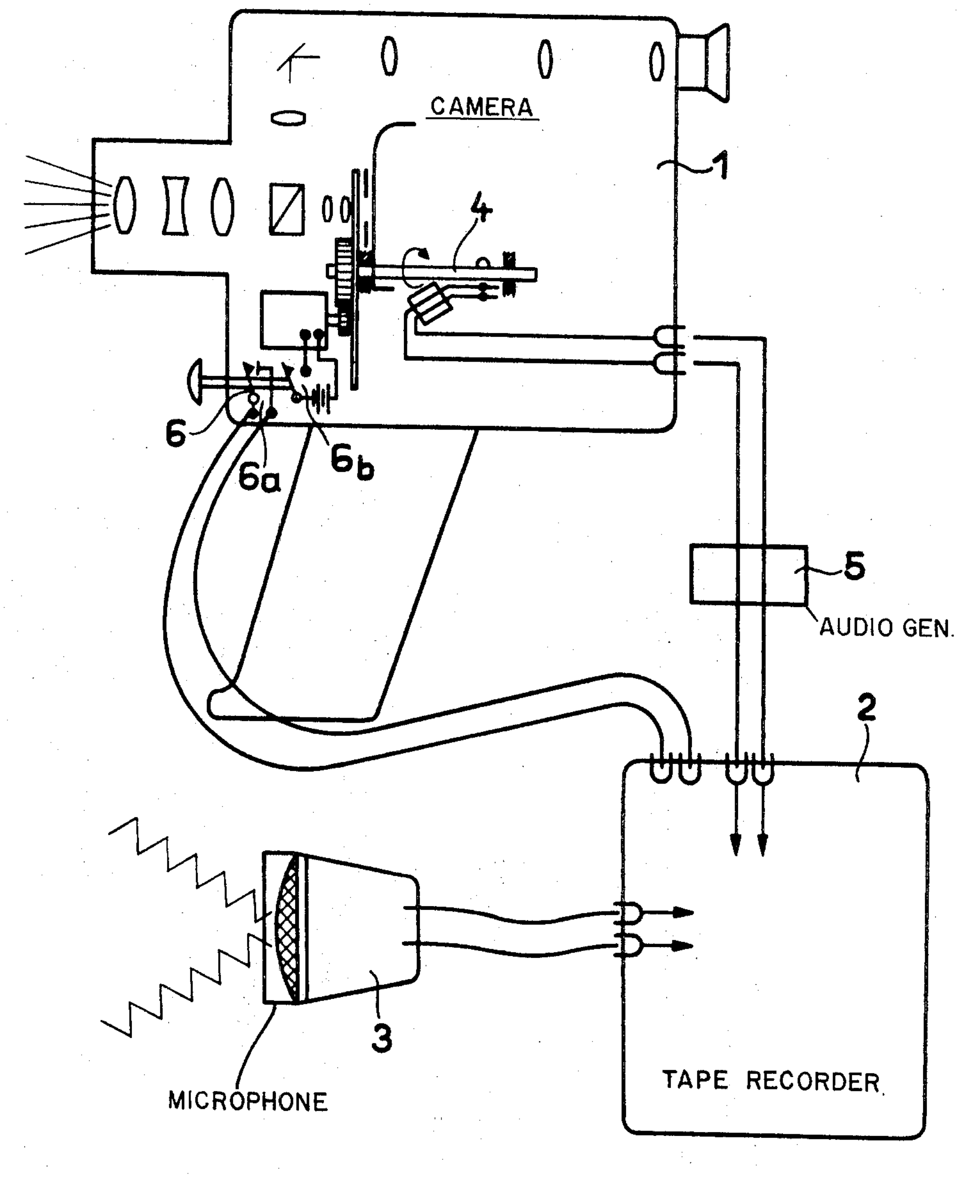
FIG. 1 shows the non-synchronous recording of sound events on a tape recorder to prepare a tape to be processed.

FIG. 1 shows a movie camera 1 which is coupled to an ordinary tape recorder 2. Also connected to the latter is a microphone 3 for recording the sound events. The camera 1 comprises a pulse contact 4 which on each frame change makes contact and triggers an audio generator 5 whose signals are recorded on a first track of the tape recorder. The signals produced by the microphone are recorded on the other track of the tape recorder.

The movie camera 1 further contains a double-poled start switch 6 whose first contact pair 6*a* controls the running of the tape recorder and whose second contact pair 6*b*, which closes delayed with respect to the first contact pair, starts the movie camera. The delay is timed so that the tape recorder 2 has reached its desired speed when the contact pair 6*b* closes.

As soon as the contact pair 6*b* is closed the movie camera 1 begins to run, and the pulse contact 4 producing on each frame change a pulse which triggers the audio generator 5. The audio signal voltage produced by the latter with for example a frequency of 1 kc/s is recorded on one track of the tape recorder 2. It is of course also possible to generate more or less than one pulse per frame.

Figure 2:
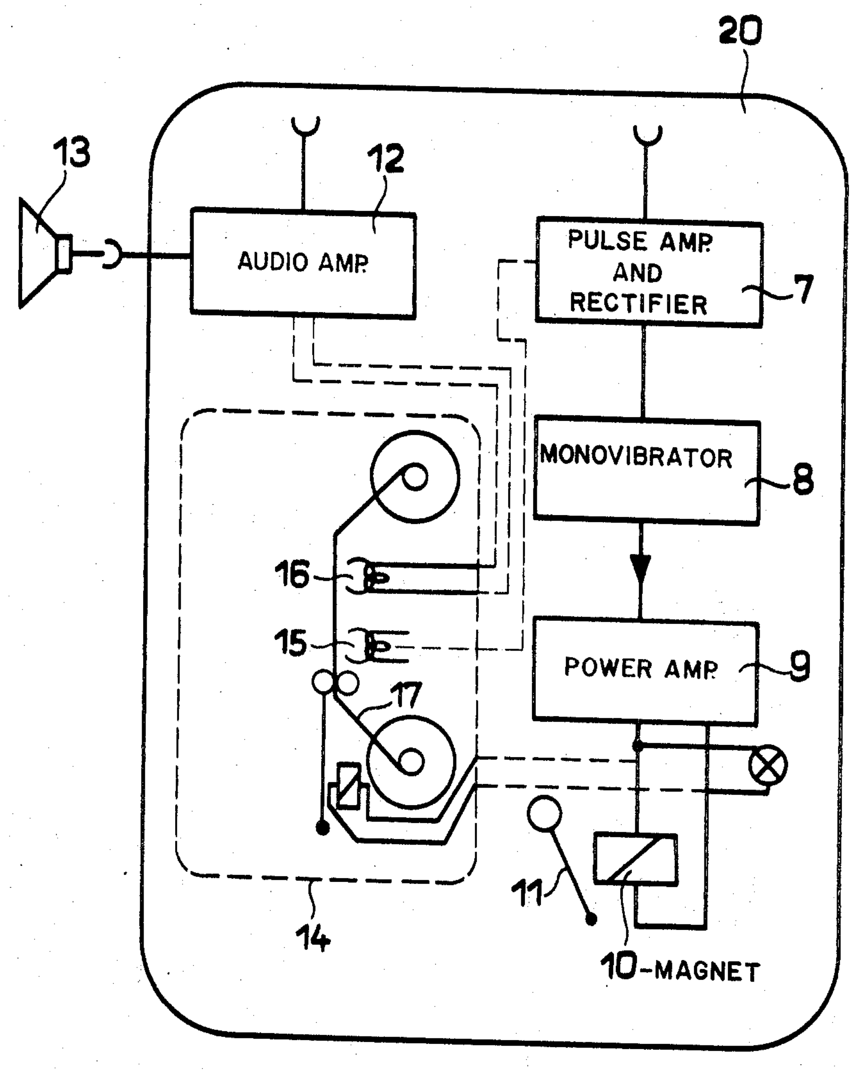
FIG. 2 shows a block circuit diagram of an apparatus according to the invention.

The synchronizing apparatus according to the invention illustrated in FIG. 2 comprises a pulse amplifier and rectifier 7 which amplifies and rectifies the 1 kc/s signals taken from the pulse track of the tape so that a DC pulse is produced at the output. This pulse controls a monovibrator 8 whose flip time is of the order of magnitude of the frame change time of the movie camera 1. The output voltage of the monovibrator 8 switches on a power amplifier 9 for a time corresponding to the flip time and said amplifier energizes a magnet 10 of a magnetically actuable pressure roll 11 of a sound recording apparatus.

The sound recording apparatus may be included in the synchronizing apparatus as illustrated in dashed line in FIG. 2 or a conventional tape recorder may be used for this purpose which is provided with an electrically controllable rapid stop device.

The synchronizing apparatus 20 may also contain an audio amplifier 12 to which is connected a pilot loudspeaker 13.

In the case of a sound recording unit integrated into the apparatus according to the invention the sound head 15 for the one track is connected to the pulse amplifier at a point in front of the rectifier so that with said sound head the 1 kc/s signals corresponding to the pulses are recorded. The second sound head 16 is connected to the sound amplifier 12 and records the sound events on the other track of the tape 17. With an integrated sound recording unit the magnet 10 and the pressure roller 11 are of course included therein.

The tape prepared with the apparatus according to the invention is picture-synchronous. It may be played back with an ordinary tape recorder for sound film showing or with the apparatus according to the invention if a sound recording unit is integrated therein. If the tape recorder used for playing back and the film projector have a sufficiently constant running speed no further means are necessary.

However, generally the tape recorder and film projector do not run synchronously or even approximately synchronously. In such a case, a control device 18 controlled by the pulses of the tape 17 is used which is constructed in a manner known per se and for example integrated completely or partly into the film projector.

Figure 3:
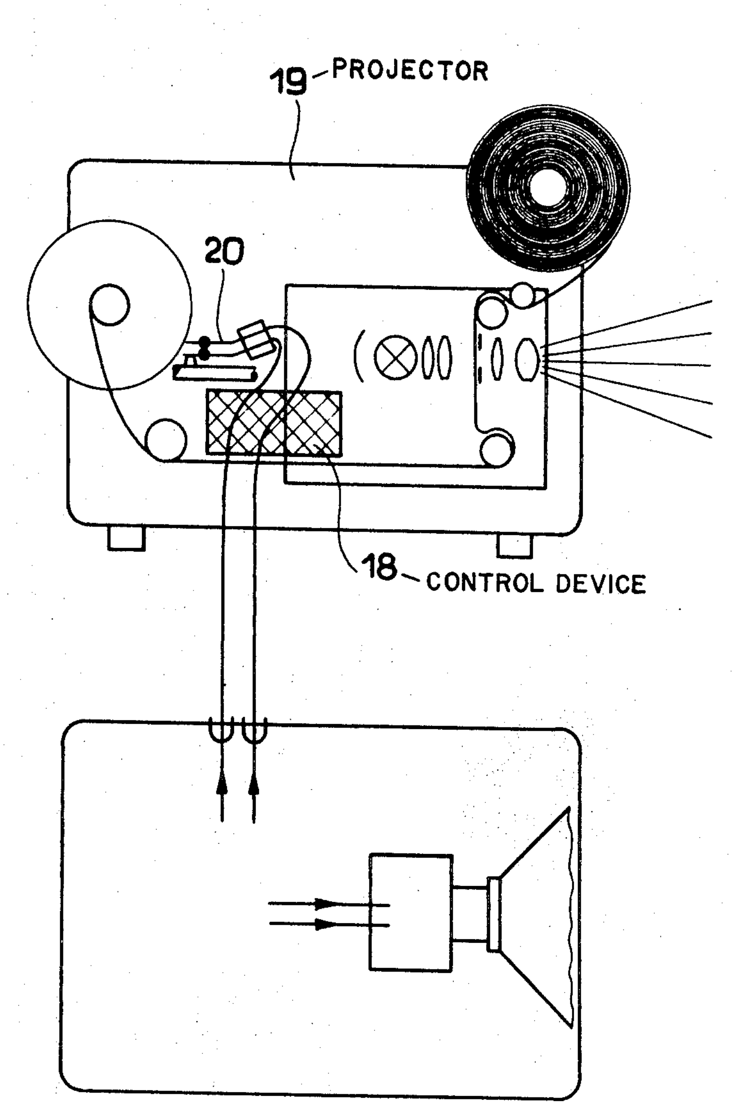
FIG. 3 shows the use of a tape recorder synchronized with the apparatus according to FIG. 2 for sound film reproduction.

FIG. 3 shows a film projector 19 provided with such a control device in conjunction with a tape recorder 2 on which the sound tape 17 is played back. The control device comprises two inputs, one input for the pulses of the tape 17 and another input for picking up pulses from a contact pair 20 which is actuated by a member of the film feed mechanism. By comparing the contacting of the contact pair 20 with the pulses of the tape a synchronous running of the tape recorder and film projector may easily be obtained in known manner.

Figure 4:
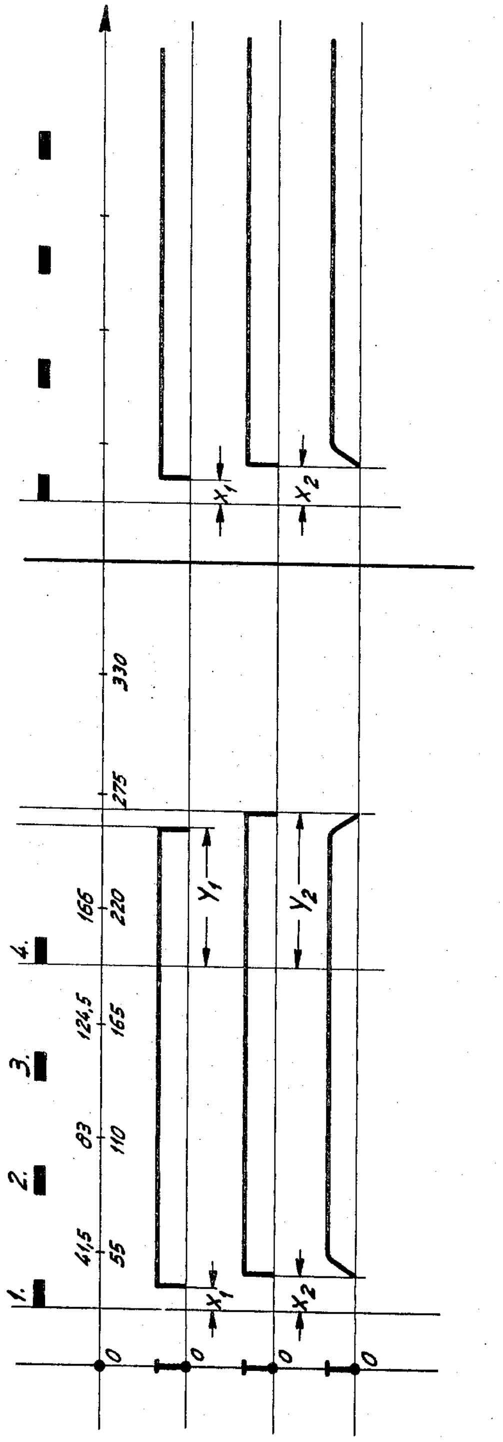
FIG. 4 is a graph showing the association with time of the actuation of the pressure magnet, the tape speed and the amplification factor with respect to the pulses.

FIG. 4 shows graphs for various states of the apparatus according to the invention in time relationship to the pulses. In the upper graph the pulses of two successive scenes each having four frames are shown. The graph below shows the excitation current of the magnet 10 which for known reasons is delayed with respect to the start of the first pulse in a scene. The third shows the variation of the tape speed as a function of the time. It is apparent that the tape speed is delayed with respect to the start of the excitation of the magnet. The initial delay $x_1$ and the drop delay $y_1$ of the magnet have no direct significance for the correct mode of operation. It is, however, important that the delay $x_2$ of the start of the tape running compared with the start of a pulse and the delay $y_2$ of the tape stopping compared with the start of a pulse satisfies certain conditions; $y_2 - x_2$ must be approximately equal to the frame change time, i.e. the interval between two successive frames. For a frame frequency of 18 frames per second this time is 55 m sec and for 24 frames per second 41.5 m sec. The circuit should preferably be so constructed that for successive pulses in one scene there is no interruption of the excitation current in order to ensure that the tape feed between individual pulses is not interrupted or irregular.

The lower graphs in FIG. 4 show the volume as a function of the time. It can be seen that at the start of a scene the volume gradually rises to its full value in that at the end of a scene it gradually decreases again. This has the advantage that on passing from one scene to another and at the beginning of a scene there are no troublesome noises such as current inrushes.

It has been assumed in the preceding description that the film camera runs from the start with its desired speed. However, this is not true in particular with an electric motor drive. However, it may be assumed that this starting-up delay is always constant. It may therefore be compensated for with the apparatus according to the invention by setting the delay device to a correspondingly larger delay time, for example by increasing the flip time of the monovibrator 8.

I claim:

1. A method for use with a movie projector for obtaining sound synchronous with a movie film from the sound events which film has been recorded on a first tape track of a first tape recorder, and pulse data associated with the scene beginning of the film has been recorded on a second tape track of the first tape recorder, comprising the steps of:

during running of said film and said first tape recorder said sound events and pulse data are played back onto respective first and second tracks of a rapidly startable and stoppable second tape recorder whereby the start and stop of the second tape recorder is controlled by the pulse data and the stop is effected with a delay which corresponds substantially to the difference between the frame sequence time of the movie projector and the start delay time of the second tape recorder, and using said sound events recorded on the first tape track of the second tape recorder as a picture-synchronous sound recording.

2. A sound processing apparatus for use in connection with a movie for processing a tape which tape comprises on one track the sound events to be synchronized and on another track pulse data of a moive camera synchronous with the picture sequence, said apparatus comprising a rapidly startable and stoppable sound recording unit having at least two sound tracks, a control means for energizing the start mechanism of the sound recording unit on the occurrence of a pulse data input, a delay means for delaying deenergizing the sound recording unit after the occurrence of a pulse data for a period of time corresponding substantially to the difference between the frame sequence time of the movie projector and the delay time of the sound recording unit, and switching connection means for playing the sound events and the pulse data from the tape to be processed onto the two tracks of the sound recording unit.

3. An apparatus according to claim 2, characterized in that said sound recording unit comprises a magnetically actuable pressure roll as start mechanism.

4. An apparatus according to claim 2, characterized in that the said control means includes an amplifier.

5. An apparatus according to claim 2, characterized in that said control means includes an amplifier which is connected to a pulse-forming stage.

6. An apparatus according to claim 2, characterized in that said delay means includes a monovibrator.

7. An apparatus according to claim 2, characterized in that said delay means includes a monovibrator having an adjustable flip time.

8. An apparatus according to claim 2, characterized in that an audio generator controllable by said pulse data is interposed at a point preceding the pulse recording head of said sound recording unit.

9. An apparatus according to claim 2, characterized in that said delay device includes a monovibrator, that an audio generator controllable by said pulses is interposed at a point preceding the pulse recording head of said sound recording unit, and that the control input of said audio generator is connected to said monovibrator.

10. An apparatus according to claim 2, characterized by an amplifier control circuit interposed into the audio signal path for smoothly changing the gain from zero to the intended value at the start of operation of the sound recording unit and from said desired value to zero at the stop of operation, said control circuit having an adjustable rise time and decay time between 0.05 to 0.2 seconds.

11. An apparatus according to claim 2, characterized by an optical indicating device controlled by the pulse data.

12. An apparatus according to claim 2, characterized by a pulse counter which counter can be made to count up and down.

13. An apparatus according to claim 2, characterized by a built-in pulse generator the operation of which is controlled by the movie camera.

14. An apparatus according to claim 2, characterized by a scene counter which is made to count up and down.

15. An apparatus according to claim 2, characterized in that the sound recording unit is operable forwardly and rearwardly with substantially the same tape speed.

16. An apparatus according to claim 2, characterized in that the sound recording unit comprises a rapid rewinding device.

17. An apparatus according to claim 2, characterized by an erasing device for separately erasing each of the sound recording and pulses.

18. An apparatus according to claim 2, characterized in that the pulse head of the sound recording unit is connected to an erasing current source during the pulse intervals.

19. An apparatus according to claim 2, characterized by a start and stop device for operating the sound processing apparatus independently of pulses.

20. An apparatus according to claim 2, characterized by a control device for controlling the speed of the projector by the pulse data.

* * * * *